United States Patent [15] 3,646,260

Bolger [45] Feb. 29, 1972

[54] ELECTRONIC EDITING APPARATUS

[72] Inventor: Thomas V. Bolger, Pennsauken, N.J.

[73] Assignee: RCA Corporation

[22] Filed: Mar. 17, 1969

[21] Appl. No.: 807,495

[30] Foreign Application Priority Data

Mar. 28, 1968 Great Britain ......................14,944/68

[52] U.S. Cl. ......................................178/6.6 A, 179/100.2 B

[51] Int. Cl. ..................G11b 27/08, G11b 27/14, H04n 5/78

[58] Field of Search ...................178/6.6 A, 6.8; 179/100.2 B

[56] References Cited

UNITED STATES PATENTS

| | | | |
|---|---|---|---|
| 3,051,777 | 8/1962 | Lemelson | 178/6.6 |
| 3,123,668 | 3/1964 | Silva | 178/6.8 |
| 3,180,930 | 4/1965 | Bounsall | 179/100.2 |
| 3,364,306 | 1/1968 | Brown | 178/6.6 A |

OTHER PUBLICATIONS

Journal of the SMPTE, Vol. 76 No. 3, March 1967, " An Automatic Video- Tape Editing/Splicing System Using a Process Computer. pp. 169- 176.

*Primary Examiner*—Howard W. Britton
*Attorney*—Edward J. Norton

[57] ABSTRACT

There is disclosed a system operative in conjunction with a video recorder-reproducer, for providing controlled editing of information on a record medium. A desired portion or portions of the recorded information are located, selected and modified by provision of devices for generating, manipulating and storing data correlated to the information portion to be edited on the record medium.

8 Claims, 2 Drawing Figures

INVENTOR
THOMAS V. BOLGER

BY Edward J. Norton
ATTORNEY

INVENTOR
THOMAS V. BOLGER

BY Edward J. Norton
ATTORNEY

ELECTRONIC EDITING APPARATUS

This invention relates to systems for recording and reproducing information and more particularly to a system for editing video information recorded on a record medium.

With the advent of magnetic tape as the major source of television broadcast material, tape editing has become a very important part of the broadcast operation. Whether the station operator is interested in taping an entire program or inserting a commercial, electronic splicing has become an everyday reality. A fundamental requirement of any recorded material editing system, is that it be electronic. In addition it is desirable that the editing operator be able to accurately locate and preview the edit points before he actually performs the editing, and that these operations be performed automatically.

Many existing editing systems require the use of manual locating and splicing techniques. Other systems require that a series of visible or electronic markings be placed on the record medium. Such approaches are time consuming and are more easily susceptible to operator error. Further, where a series of additional electronic markings, which are not required for normal record-reproducing operation, are placed on the record medium, special additional transducing equipment must be provided in the basic recorder-reproducer system.

It is therefore an object of the present invention to provide an improved system for controlled editing of information recorded on a record medium.

In accordance with the present invention, there is provided in combination with a recorder-reproducer system having means for playing back frames of video information from a record medium, and means for recording video information from a separate source, on the medium, a device for providing controlled editing of the recorded video information. The device comprises means including a single record-playback transducer for selectively recording a solitary reference mark on the medium in spaced relation to a given portion of the recorded video information, during a first pass of the medium through the recorder-reproducer. Means are provided for storing data indicative of the position of selected frames, of the given portion of recorded video, with respect to the reference mark, during the first pass of the medium. And there is provided, means active upon playback of the reference mark which are coupled to the separate video source. The means are responsive to the stored data for replacing the given portion of recorded video, during a subsequent pass of the medium through the recorder-reproducer.

Figure 1:
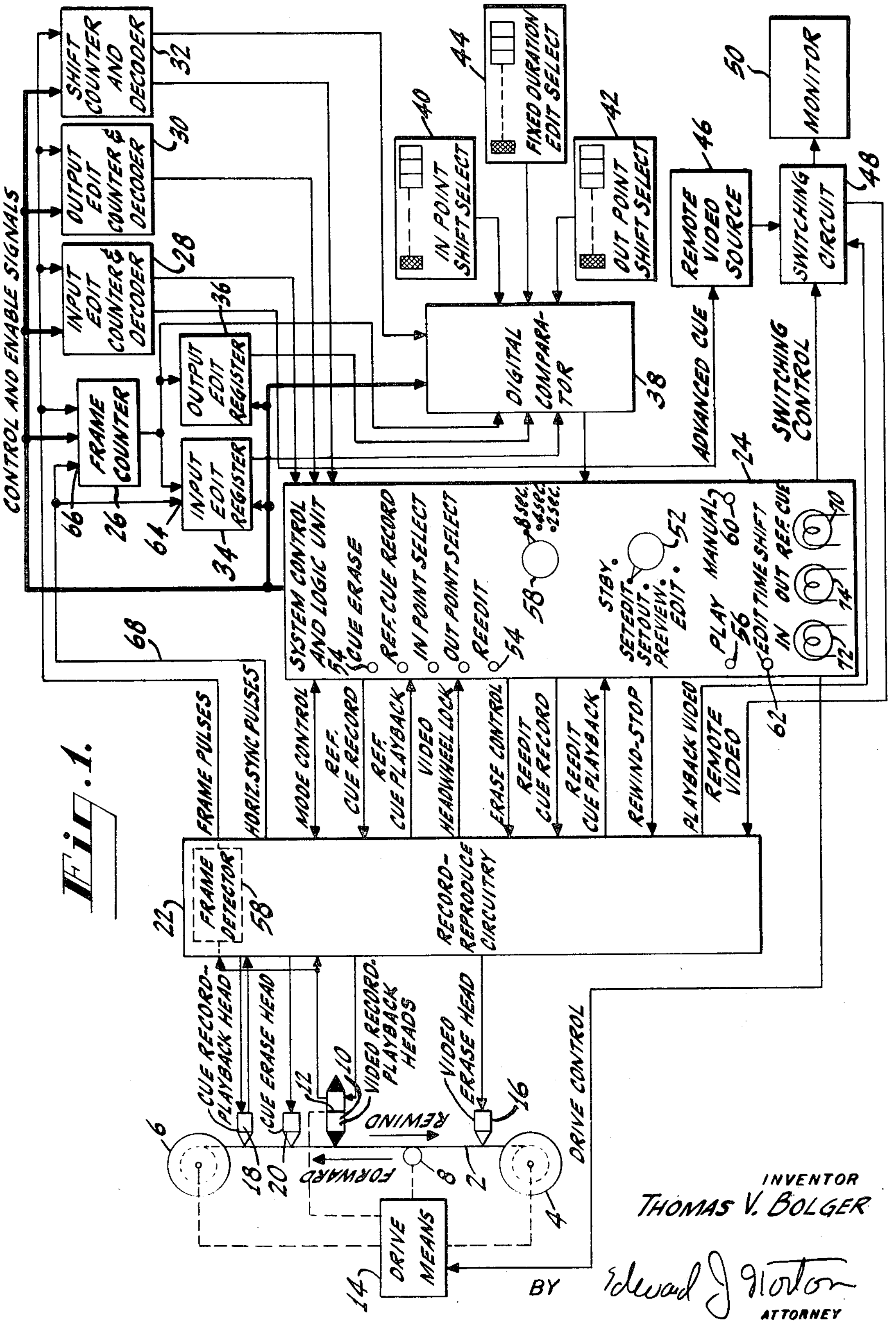
FIG. 1 is a diagrammatic representation of an editing system for a video recorder-reproducer according to one embodiment of the present invention.

If reference is made to FIG. 1, there is shown an idealized representation of the elements of a transverse recording and reproducing system, which is widely used for transducing video information. A record medium 2 is transported between a supply reel 4 and a takeup reel 6 by a capstan 8. Along the path of the record medium 2, are a series of recording and reproducing information transducer heads. The principal video recording and reproducing device is provided by a head wheel 10, having a number of peripherally mounted transducer heads 12. The head wheel 10 rotates about an axis substantially parallel to the direction of the path of the record medium 2, so that the transducers 12 scan successive transverse tracks of video frames across the record me;ium 2 as it is moved. The supply reel 4 and takeup reel 6, as well as the capstan 8 and headwheel 10, are driven by a drive means 14.

Preceding the record-reproduce position for the transverse video tracks, is a video erase transducer head 16 which is positioned along the medium 2 and separated from the headwheel 10 by a known fixed distance. Following the position of the headwheel 10 by a known fixed distance, a cue record-playback transducer head 18 is mounted along one edge of the medium 2, for transducing a longitudinal cue track to one side of the video information. Between the cue record-playback transducer 18 and the headwheel 10, is a cue track erase transducer head 20.

The record-reproduce circuitry 22, which operates conjunctively with the record medium transport and the various transducers previously described, is represented generally since such circuitry is well known in the art. The interrelationships among the medium transport, the transducer elements, the record-reproduce circuitry 22 and the system control and logic unit 24 are shown specifically and will be hereinafter further discussed.

The system control logic unit 24 preferably includes a number of mode determining, parameter selection, and system actuation controls, along with a series of interconnected gates and flip-flop elements arranged as well known logic circuits. The controls and logic circuits cooperate to provide generation and steering of control commands as well as manipulation of certain digital data related to intervals along the record medium. The control and logic unit 24 is coupled with a series of digital data circuits comprising counters 26, 28, 30 and 32, storage registers 34 and 36, and a digital comparator 38. The counters 28, 30 and 32 include count decoder means for providing indications of specific frame and hence time occurrences. The digital data circuits include standard logic gates such as NAND gates, as well as flip-flop circuits arranged as shift registers and ripple counters, whose makeup and operation are well known in the art and therefore need not be shown and discussed in detail.

When the invention is to be utilized with, for example a video format having 30 frames per second, the digital data circuits are made to handle any number of frames from, for example, one to 18,000. This enables the circuits to measure and store any interval up to 10 minutes in one frame increments.

Coupled to the digital comparator 38 are an in point shift select element 40, an out point shift select element 42 and a fixed duration edit select element 44. These elements are the type of digital register, which includes means for manually setting the element to output a particular digital value, corresponding to a given number of video frames. For purposes of explanation herein, the elements 40 and 42 are made to be capable of being set to any value representing a shift in edit points of ±90 frames (3 seconds) in one frame increments. The element 44 is capable of being set to any value representing a duration of approximately 18,000 frames (10 minutes) in one frame increments.

Also shown in FIG. 1, is a remote video source 46 whose operation is controlled by an advanced cue signal from the counter decoder 28. The remote video source 46 may for example be a separate video recorder reproducer, or any separate source of video information, which will provide particular portions of video information upon command. A switching means 48, has signal inputs coupled to the output of the remote video source 46 and the output from the record-reproduce circuitry 22, which provides the video played back from the record medium 2. A monitor 50 is coupled to a first output of the element 48. A second output of switching means 48, comprising the remote video is coupled to the record-reproduce circuitry 22. The element 48, in response to control signals from the system control logic unit 24, provides a desired video to the monitor 50, as well as providing remote video, to the record-reproducer circuitry 22 during certain operation of the system.

For simplicity and clarity, only single interconnecting lines are shown for the elements in FIG. 1; however, each line may consist of one or more actual wires. This is particularly true, for example, where 17 bits are used to digitally represent data, since for parallel digital operation 17 interconnecting wires are required.

For purposes of simplicity and clarity, the operation of the system of FIG. 1 will be described in terms of its operating modes. For present purposes, suppose it is desired that some portion of the video information already recorded on the record medium 2 is to be edited. The beginning and end, or in point and out point, of the portion to be altered must be determined. To accomplish this the operator places the control 52 on the system control and logic unit 24 in the SET EDIT position. The operator depresses the control button 54 marked CUE ERASE, and initiates operation of the recorder-reproducer by pushing the PLAY button 56. This starts the recorder-reproducer playing back the video on the record medium 2 to the monitor 50 and erases the cue track on the medium 2.

Playback proceeds to a point which the operator determines to be the vicinity ahead of the recorded information to be edited or altered. The REF. CUE RECORD control button 54 is then depressed and a reference cue mark, which for example may be a 400 Hz., 2.5 sec signal, is electronically recorded on the cue track of the medium 2 by the head 18. The initial placement of the reference cue mark is arbitrary, as long as it precedes by a predetermined minimum interval, the point on the medium which will be the beginning or in point of the edit. For present purposes this minimum interval is made to be 14 seconds, which corresponds to 420 video frames. This interval is necessitated by the relative placement of the various transducer heads and the time sequencing of various parts of the editing system, which will be better understood when the PREVIEW and EDIT operations are described. Coincident with the recording of the reference cue mark, the frame counter 26 is initialized and enabled to begin counting frame pulses. These frame pulses correspond to each video frame recorded on the medium 2, and are generated by the frame detector 58 which forms a portion of the record-reproduce circuitry 22.

The operator continuously monitors the video playback from the medium 2. Following the recording of the reference cue mark and the elapse of at least 14 seconds, the operator selects the in edit or splice point by depressing the IN POINT SELECT button 54. Depressing the IN POINT SELECT button 54 causes a value corresponding to the number of frames in the frame counter 26 at that moment, to be stored in the input edit register 34. Monitoring of the playback video and frame counting, which has proceeded without interruption, continues and the operator selects the out edit or splice point by depressing the OUT POINT SELECT button 54. This causes a value corresponding to the number of frames in the frame counter 26 at that moment, to be stored in the output edit register 36.

Simultaneously, the control unit 24 enables the input edit counter 28, to count for 4 seconds corresponding to 120 frames, at the termination of which, the control unit 24 causes the record medium 2 to be rewound. Rewind continues until the reference cue mark is detected by head 18, at which time a command to stop the recorder-reproducer is generated by the control unit 24. The in and out edit points, defining the portion of the video to be altered on the medium 2, have now been determined. Only one mark has been recorded on the medium 2 and that is the reference cue mark. The in and out edit points are stored in the digital registers 34 and 36 respectively, with the medium 2 unmarked at those points.

The operator may now desire to check his selection by previewing the edit, before the actual alteration of video is made on the record medium 2. To accomplish this, PREVIEW is selected on the control 52, and the PLAY button 56 is depressed. The medium 2 is then drawn forward past the cue playback head 18, which detects the leading edge of the reference cue mark. The video playback heads 12 reproduce the video from the medium 2 and it is displayed on the monitor 50 for observation by the operator.

Upon detection of the reference cue mark, the control unit 24 presets the frame counter 26 to a given value of say 330 frames or 11 seconds, and enables the frame counter 26 to begin counting. Presetting a value into the frame counter 26, is necessitated by the requirement of certain anticapatory time commands which must be generated, and will be better understood from the further discussion of the mode operation. The value in the frame counter 26 which is running, is compared to the value in the input edit register 34 by the digital comparator 38. When the values are equal, a pulse from the control unit 24 stops the frame counter 26 and enables the shift counter 32. The shift counter can run for a maximum of 6 seconds and also counts frames.

The comparator 38 compares the value in the shift counter 32, with whatever value is manually set into the in point shift select element 40. When the in point shift select element 40 is set to zero, equality will occur after 3 seconds which is 90 frames. Recalling that the element 40 may be set for any value up to 6 seconds (180 frames), it is therefore possible to shift the original in point of the edit ahead or back in one frame increments up to 3 seconds, by presetting the desired value in the in point shift element 40. For purposes of explanation here, the in point shift select 40 is assumed set to zero.

When the value in the shift counter 32 equals the value of the in point shift select element 40, a signal from the control unit 24 enables the input edit counter 28. The input edit counter 28 runs for precisely 8 seconds or 240 frames, since the start of the input edit counter is 8 seconds ahead of the in point or beginning of the video portion to be edited. In order to permit the remote video source 46 to be ready to supply the new information when the in edit point is reached, the changing value in the input edit counter 28 is decoded to provide an advance cue signal to the remote source 46.

The time of the advance cue signal is controllable by selecting an appropriate value of, for example, 2, 4 or 8 seconds on the control 58 of the control and logic unit 24. When the input edit counter 28 has run for 8 seconds (240 frames), a command from the control unit 24 causes the switching circuit 48 to switch the monitor 50, from the playback video of the recorder-reproducer to the material from the remote source 46. Thus the beginning of the splice or edit has been simulated and may be observed by the operator.

The operator continues to observe the monitor 50 and the termination of the preview occurs as follows. It is first recalled that the frame counter 26 was preset the equivalent of 11 seconds ahead of time, but in arriving at the in point of the edit, 3 seconds of advance were lost in the shift counter 32, and 8 seconds were lost in the in edit counter 28. Thus, the 11 second advance is removed. However, the frame counter 26 was stopped when the value of the frame counter 26 equaled the value in the input edit register 34. Therefore the frame counter 26 is enabled and again starts counting when the shift counter reaches 6 seconds. The comparator 38 compares the count in the frame counter 26, with the value in the output edit register 36. When these two values are equal, a command from the control unit 24 stops the frame counter 26 and enables the shift counter 32.

At this time, the system is 5 seconds ahead of the out point of the edit. The shift counter 32 which is now running, is compared for equality by the comparator 38 with the value set into the out point shift select element 42. The make up and operation of the element 42 is the same as previously described for the in point shift selector 40. A setting of zero is again assumed and therefore will require 3 seconds to produce equality with the shift counter 32. At this point, the system is 2 seconds ahead of the out point of the edit.

At the moment of equality between the values of shift counter 32 and the out point shift select element 42, the control unit 24 enables the output edit counter 30. The counter 30 is made to run for only 2 seconds and terminates the preview, by causing the switching means 48 to switch the monitor 50 from the remote video to the playback video of the medium 2 in the recorder-reproducer. In addition as described in the SET EDIT mode, the input edit counter 28 is enabled for 4 seconds, after which time the record-medium is rewound and stopped following the detection of the reference cue mark by the head 18.

Figure 2:
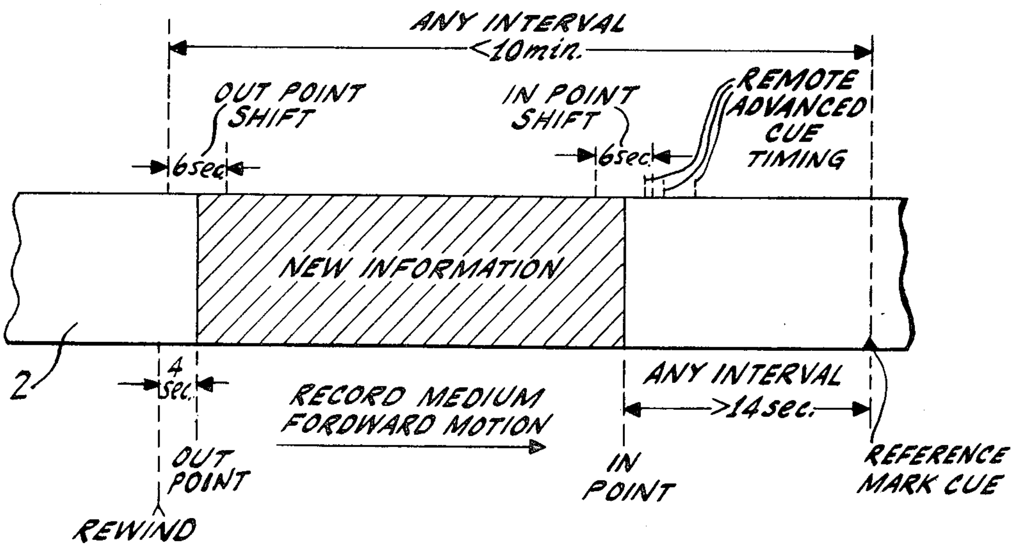
FIG. 2 is a simplified timing diagram showing the sequence and interrelation in which various elements operate in accordance with the editing system of FIG. 1.

The operation of the system in the SET EDIT and PREVIEW modes described, may better be understood from the sequences of events shown in the timing diagram of FIG. 2. The spacing shown is by way of example, and again the system is assumed to be one operating at a rate of thirty frames per second. FIG. 2 shows the relative locations of the in point and out points of the edit, with respect to the reference cue mark on the record medium 2. Also shown, is the relationship of the advanced cue for the remote source 46 to the selected in point. Three possible time occurrences for the advanced cue are shown, since it is to be recalled that a value of 2, 4 or 8 seconds may be selected by the operator by the control 58.

FIG. 2 also shows 6 second (180 frame) intervals bracketing the in point and out point of the edit. These represent the capability of shifting the in and out edit point forward or backward, by setting in an appropriate value in the respective shift selectors 40 and 42. This capability might be utilized, where after previewing the edit, it is decided to alter the in and/or out edit point. For such a situation, it is unnecessary to select new in and out points in the SET EDIT mode. The operator merely selects the desired shift in the selectors 40 and 42 and previews the material with the new in and out points. This process may be repeated any number of times.

When the operator is satisfied the edit to be made is as desired, he initiates the EDIT mode during which the new information from the remote source 46, actually will be recorded on the record medium 2. This is accomplished by selecting the EDIT position on the control 52 and depressing the PLAY button 56. Again the medium 2 will be drawn forward past the head 18, where detection of the reference cue mark initiates the counting and data manipulation sequences.

The sequence and manner of occurrence of the events in the EDIT mode, is substantially as described for the PREVIEW mode, except as follows. Since the video information recorded on the medium 2 is to be actually altered, the EDIT mode provides appropriate control of the video erase and record transducers and the remote video through the control unit 24.

Recalling the operation of the input edit counter 28 in the PREVIEW described above, it is to be noted that the input edit counter 28 will always begin its initial count 8 seconds or 240 frames ahead of the in edit point. As previously indicated, the counter 28 includes a count decoder means. The decoder is capable of providing an output corresponding to a particular count. Assume for present purposes, the video erase head 16 is spaced say 18 frames upstream from the video record playback heads 12. The decoder of the counter 28, is made to output a signal 18 frames ahead of the in edit point.

In response to the signal from the decoder 28, a signal from the control unit 24 starts the video erase head 16 erasing at precisely the in edit point. Also as described in the PREVIEW mode, the output edit counter always begins a count 2 seconds or 60 frames, ahead of the out edit point. Thus in the same manner as just described, the decoder of the output edit counter 30 is made to output a signal 18 frames ahead of the out edit point. In response to this signal, the control unit 24 terminates the erasing operation of the head 16.

Further in the EDIT mode, when the comparator 38 indicates count equality corresponding to the in edit point, the control unit 24 places the record reproducer system in the record mode, and causes the switching circuit 48 to provide the remote video to the recording circuitry 22 for recording on the medium 2. In the same manner, the remote video input to the record circuitry 22 is removed and the recorder-reproducer system is disposed in playback by the control unit 24, when the comparator 38 indicates count equality corresponding to the out edit point.

It the EDIT mode, in addition to recording the new video material, the control unit 24 enables the cue record head 18 for recording two cue marks on the cue track of the medium 2. These marks, hereinafter referred to as reedit marks, are preferably a 400 Hz. signal of one frame duration. One mark is recorded when the location of the in edit point on the medium 2 is as at the video head 12. The other mark is recorded when the location of the out edit point on the medium 2 is at the video head 12. The purpose and function of these reedit marks will be understood from the discussion of the RE EDIT operation herein disclosed.

In addition to the features already discussed, other features are provided by the embodiment of the present invention. For example, the out edit point may be selected on the basis of the end of the new material to be recorded, rather than the end of the original material. Where the duration of the new material is unknown, the in point is selected in the SET EDIT mode as previously described. The out edit point is now determined as follows. The selector 52 on the control unit 24 is placed in the SET OUT position and the PLAY button 56 is pushed.

The sequence of events in the SET OUT mode, proceeds just as described for the PREVIEW mode up to the occurrence of the in edit point. As in the PREVIEW mode, the remote video is displayed on the monitor 50 and the frame counter 26 is restarted when the input edit counter equals 8 seconds. Now however, the operator observes the new material and when the edit is to be terminated, he depresses the OUT POINT SELECT button 54. This causes the value in the frame counter 26 at that moment, to be transferred to the output edit register 36. Thus this out point edit information is stored, and will determine the out edit point when the edit is now previewed and edited.

Where the duration of the new material is known the out edit point is determined as follows. A value corresponding to the duration of the edit, is manually set into the fixed duration edit select element 44. On the control unit 24, either the PREVIEW or the EDIT mode is selected on the control 54, the MANUAL switch 60 is depressed and the medium 2 is advanced by depressing the PLAY button 56. Assume for present purposes, the PREVIEW mode has been selected on the control 54. The sequence of events is the same as previously described for the PREVIEW mode to the point where the input edit counter 28 is 2 seconds ahead of the in edit point.

The normal PREVIEW sequence is now altered as follows. The frame counter 26 is reset to zero and started counting. The value in the frame counter 26 is compared to the edit duration value which was set into the fixed duration edit select element 44. When the comparator 38 indicates the values are equal, the system is 2 seconds ahead of the desired out edit point, since it must be remembered the comparison was started 2 seconds ahead of the in edit point. Thus when the equality of the value of the frame counter 26 and the duration edit element 44 is sensed, the control unit 24 starts the output edit counter 30 running for 2 seconds. At the conclusion of the 2 second count by the output edit counter 30, the medium 2 is at precisely the desired out edit point, and control unit 24 causes the monitor 50 to be switched from the remote video to the video played back from the medium 2.

Where a series of known duration contiguous edits are to be performed, the first known duration edit is accomplished as just described. The next and succeeding edits may then be performed by the operator depressing the EDIT TIME SHIFT button 62 on the control unit 24 and setting a new value for the next edit, into the fixed duration edit selected element 44. What occurs, is that the duration value manually set into the fixed duration edit select element 44, is effectively added to the value in the input edit register 34. Thus the out edit point for the previous edit, becomes the in edit point for the next edit. This is accomplished as follows.

When the EDIT TIME SHIFT button 62 is depressed, the control unit 24 resets the frame counter 26 to a value of zero and enables the frame counter 26 and the input register 34 to count a clock signal input 64 and 66 respectively. The comparator 38 is also enabled to compare the value of the frame counter 26 to the value set into the fixed duration edit select element 44. At the same time, the input edit register 34, which contains the value of the previous in edit point, is enabled to also count starting from its in edit point value. It will be understood that counting by the input edit register 34 may be accomplished by providing for the register 34, a chain of interconnected flip-flop and associated input gate for clocking the chain. Also, a bit value can be individually fed to each member in the chain in a parallel manner by associated input gates for each flip flop, in which case the register 34 behaves as a register for storing the value inputed to it. Upon command from the control unit 24, the input gates to all but the first flip-flop member in the chain are disabled from receiving separate inputs. Instead, a clocking pulse is inputed to the first flip-flop member of the chain. The sequence of clock pulses causes a controlled incrementing of the states of the flip-flop members in the chain, and thus the register 34 is enabled to count at the clocked rate.

In practice of the invention, it is preferable to perform this operation of shifting or counting information at a rate in excess of the normal frame rate, since this will reduce the operators waiting time to continue the editing. While the clocking signal may be utilized, since the rate of the video horizontal synchronizing pulses is relatively high, and is easily made available, by well-known methods, in the record-reproduce circuitry 22, the horizontal synch pulses are used as the clocking pulse in this operation. Thus FIG. 1 shows on lead 68, the horizontal sync pulses fed to the frame counter 26 and the input register 34.

Continuing now with the discussion of the edit time shift operation, it will be understood that the frame counter 26 and input edit register 34, are simultaneously incremented at the clock rate of the horizontal synch pulses. When the comparator 38 indicates equality of the value of the frame counter 26 and the value set into the fixed duration edit select element 44, the count is terminated and the register 34 is returned to the status of a storage device by the control unit 24. The value now present in the input edit register 34 is the desired point for the in point of the next edit to be made.

Another feature of the editing system described is the ability to simply and quickly reedit or replace the information already inserted, with a third piece of information. This is made possible by the presence of the reedit marks previously recorded on the cue track of the medium 2, as described in the EDIT mode of operation. It will be remembered that separate reedit marks exist on the medium 2, which are indicative of both the in edit point and the out edit point established previously. The operator selects the SET EDIT position on the control 52, depresses the RE EDIT button 54, and advances the medium 2 forward by depressing the PLAY button 56.

When the reference cue mark sensed by the head 18, is played back to the control unit 24, the reference cue lamp 70 is illuminated, and the frame counter 26 is reset to zero and enabled to count frame pulses. The operator then depresses the IN POINT SELECT button 54. The control unit 24, having been predisposed by depression of the RE EDIT button 54, is made to inhibit the transfer of the value in the frame counter 26 to the input edit register 34, until a reedit mark is played back by the head 18. When the in point reedit mark is played back, the control unit 24 illuminates the in lamp 72, and enables the value in the frame counter 26 at that moment to be transferred in the input edit register 34. Thus the in edit point has been recovered, and its location is stored in the input edit register 34. The frame counting, which has not been interrupted, continues.

The operator then depresses the OUT POINT select button 54. As before, the control unit 24 inhibits the transfer of a value from the frame counter 26 to the output edit register 36 until the out point reedit mark is played back by the head 18. When the out point reedit mark is played back, the control unit 24 enables the value of the frame counter 26 to be transferred to the output edit register 36.

Simultaneously, the out lamp 74 is illuminated indicating the out edit point has been recovered, and its location is stored in the output edit register 36. Then, as previously described for the SET EDIT mode, the input edit counter 28 is enabled for four seconds, after which the control unit 24 initiates a rewind to the reference cue mark and stops the recorder-reproducer. The full capability for further altering the particular piece of information is now provided, and the operator may proceed with previewing and editing as described above.

What is claimed is:

1. In combination with a recorder-reproducer system having means for playing back frames of video information recorded on a record medium and including means for recording video information from a separate source on said medium, a device for providing controlled editing of said recorded video information, comprising:

means including a single record-playback transducer for selectively recording a solitary reference mark on said medium in spaced relation to a given portion of said recorded video information during a first pass of said medium through said recorder-reproducer;

means for storing data indicative of the position of selected frames of said given portion of recorded video with respect to said reference mark during said first pass of said medium; and means active upon playback of said reference mark coupled to said separate video source, and responsive to said stored data for replacing said given portion of recorded video during a subsequent pass of said medium through said recorder-reproducer.

2. In combination with a recorder-reproducer system having means for playing back frames of video information recorded on a record medium and including means for recording video information from a separate source on said medium, a device for editing of a given portion of said recorded video information, comprising:

single means cooperatively related with said record medium for recording and playing back reference marks on said record medium;

means coupled to said first mentioned means for selectively recording a solitary reference mark in preceding spaced relation to said given portion of said video information, during the first pass of said medium through said recorder-reproducer;

means for counting frames of said recorded video information;

means coupled to said counting means for storing frame values;

means coupled to said first mentioned means, said counting means and said storage means, and responsive to the recording of said reference mark, for selectively storing a plurality of frame values indicative of the position of certain ones of the frames of said given recorded video portion with respect to said reference mark, during the first forward passage of said medium through said recorder-reproducer system; and means coupled to said separate source of video information and responsive to said stored values for replacing said given portion of recorded video with video from said separate source, during a second pass of said medium through said recorder-reproducer.

3. The invention according to claim 2, and further including;

means coupled to said first-mentioned means for recording on said medium, second and third reference marks indicative of the location of the extremities of the modified portion of said recorded video, during said second pass of said medium; and means coupled to said first-mentioned means, said counting means and said storage means, for enabling the storing of frame values in response to the playback of each of said second and third reference marks, during a subsequent pass of said medium through said recorder-reproducer.

4. In combination with a video recorder-reproducer system, a device for providing controlled editing of a given portion of video information recorded on a record medium, comprising:

first means for recording a reference cue mark on said record medium during a first pass of said medium through said recorder-reproducer system, said recorded reference mark proceeding said given portion of said recorded video information by an interval which is at least equal to a predetermined number of frames, with said first means having means for reproducing said reference cue mark;

detecting means for sensing each frame of said video recorded on said medium;

counting means coupled to said detecting means and responsive to the occurrence of said reference cue mark for thereafter counting frames of said video information, storage means coupled to said counting means, for storing a plurality of separate values indicative of the position of particular frames of said recorded video information with respect to said reference cue mark;

control means coupled to said storage means, enabling said values corresponding to particular frames of said given portion of said recorded video, to be stored during said first pass of said medium through said recorder-reproducer system;

means for resetting said counting means to a given value following said first pass of said medium; and comparator means coupled to said storage means and said counting means, to provide an output control signal whenever there is coincidence between the inputs of said comparator, during a subsequent pass of said medium through said recorder-reproducer system.

5. The invention according to claim 4, and further including; means for altering at least one of said frame values in said storage means to provide a value representative of a frame in advance of or following said original frame by a selectable amount.

6. The invention according to claim 4, and further including; means coupled to said comparator means for providing a selected value corresponding to a given interval of said recorded video as an input to said comparator, and means coupled to said comparator and said counting means and responsive to a first occurrence of said control output of said comparator to cause said comparator to output a second control signal following said first output signal by an interval equal to said selected input value to said comparator.

7. The invention according to claim 4, and further including; means for displaying video information, a source of video information, switching means having an output coupled to said display means and first and second inputs coupled to said video source and said recorder-reproducer system respectively, said switching means being responsive to said control signals for determining which video information is displayed on said display means.

8. The invention according to claim 7, and further including; means for storing a frame value indicative of a particular portion of said source video, and means for providing said value as an input to said comparator means with said comparator means producing an output control signal indicative of the occurrence of said particular portion of said source video during a subsequent pass of said medium through said recorder-reproducer system.

* * * * *